May 24, 1938.　　　　H. G. FERGUSON　　　　2,118,181
TRACTOR FOR AGRICULTURAL IMPLEMENTS
Filed Jan. 27, 1937　　　2 Sheets-Sheet 1
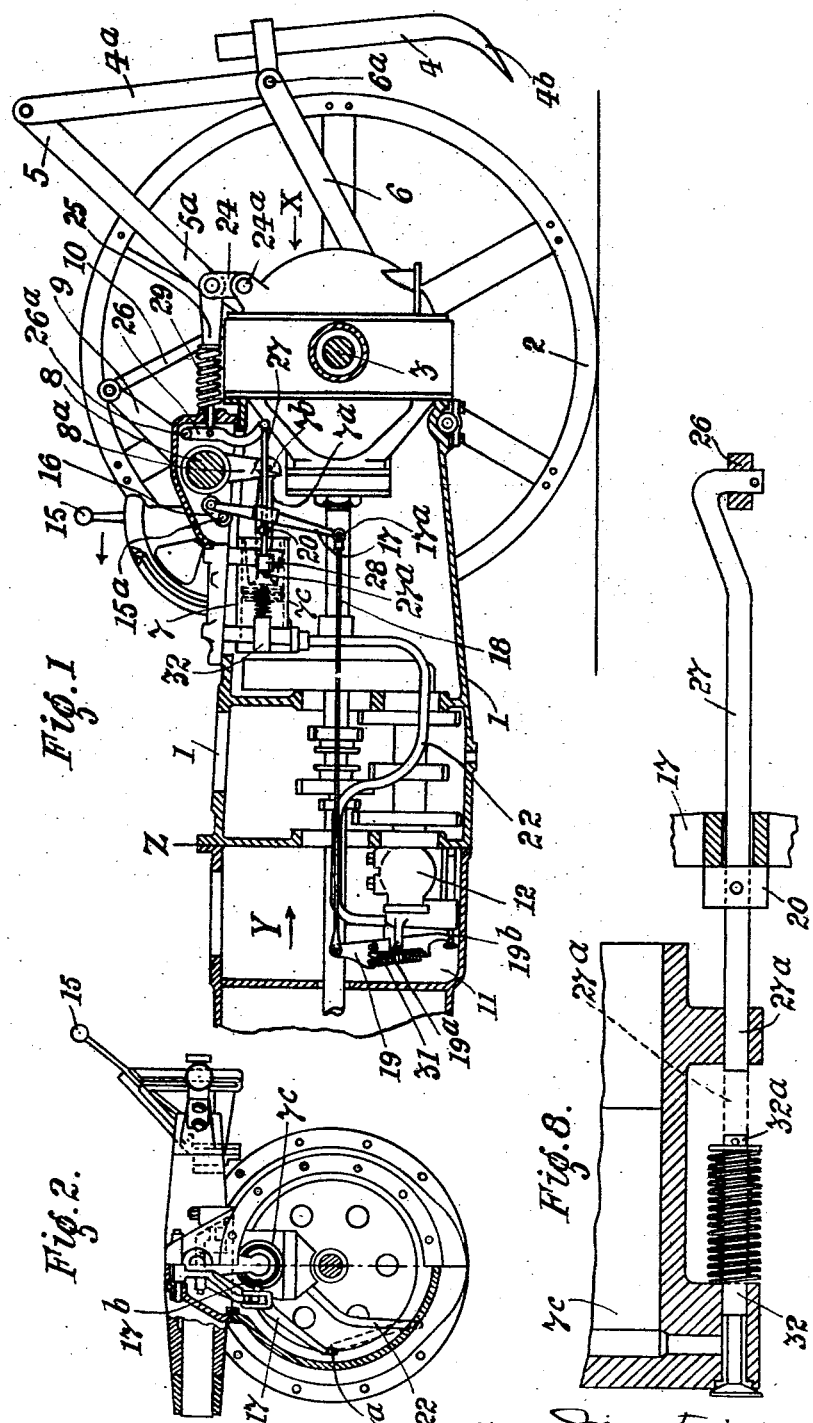

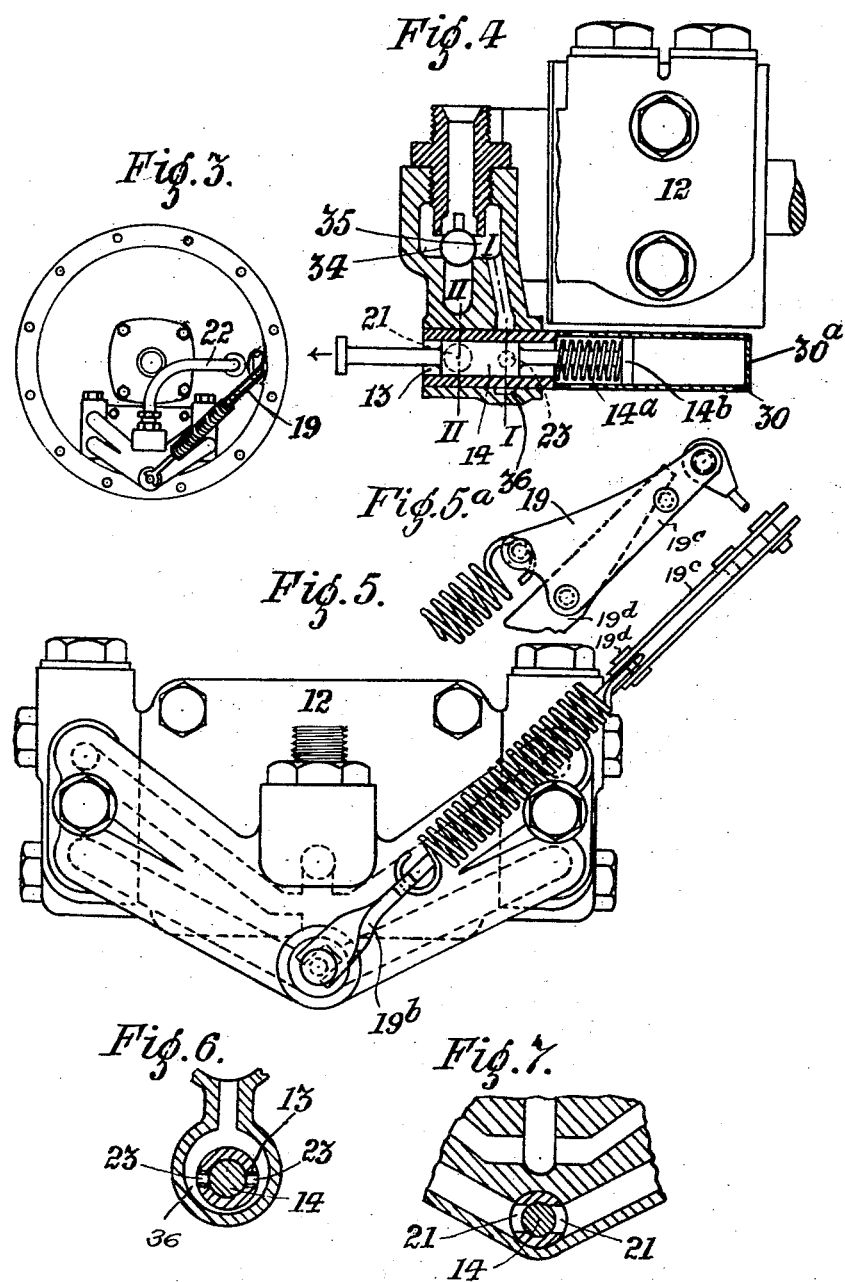

Patented May 24, 1938

2,118,181

UNITED STATES PATENT OFFICE 2,118,181

TRACTOR FOR AGRICULTURAL IMPLEMENTS

Henry George Ferguson, Belfast, Northern Ireland

Application January 27, 1937, Serial No. 122,610
In Great Britain February 5, 1936

13 Claims. (Cl. 97—50)

This invention relates to improvements in the control of tractor-drawn agricultural implements and more especially to tractors having a power-operated control unit for automatically controlling the depth regulation of the implement as described in my prior patent specification No. 1,687,719.

When an implement is carried as a unit on the tractor as described in my prior patent specification No. 1,687,719, difficulty is encountered due to the fact that when the implement strikes an obstruction such as a root or a rock, the increased draft on the implement puts the power means automatically into operation tending to raise the implement out of the ground. The tendency then is for the implement to be raised out of the ground altogether but it may be so caught underneath a ledge of rock or under a root that it cannot rise. Great downward pressure will therefore be put on the rear wheels of the tractor, which will tend to give them increased traction and lift the front wheels of the tractor off the ground. Thus either the implement or the attachment means may be broken or the front of the tractor may be raised off the ground and turned over backwards, possibly causing a fatal accident.

To overcome these difficulties in accordance with an object of the invention I provide means whereby an excess of draft on the implement due, for example, to striking an obstruction, causes the power unit to be automatically put out of effective operation.

For example, in the case of a fluid pressure control unit for controlling the implement an object of the invention is to provide that an excess of movement in the pump valve, caused by striking the obstruction, will move the valve so far that the release ports will be uncovered and allow the fluid to escape, thus automatically releasing the lifting pressure.

A further object is to provide a pressure-operable safety valve on the delivery side of the pump. This safety valve may serve the two-fold purpose of acting as a safety valve in the ordinary way to prevent excessive pressures and it may also be operable by the implement so that under excessive draft such as is caused when striking an obstruction, the safety valve will be opened and the pressure released as in the case of the above mentioned valve which uncovers the release ports. Thereupon the weight on the rear wheels of the tractor will be automatically reduced, due to the weight of the implement being taken off the tractor and due to the fact that the power-operated control unit is no longer endeavoring to raise the implement. This reduces the tractive effort and the wheels spin or slip on the ground, thus avoiding damage to the implement or connections or danger to the operator through the tractor turning over rearwardly.

The invention will now be described, but by way of example only, with reference to a specific embodiment thereof as shown on the accompanying drawings wherein:—

Fig. 1 is a part longitudinal sectional elevation of the rear portion of a tractor having means provided for hydraulic control of an implement attached to the tractor, the implement being in the raised position.

Fig. 2 is a view partly in section looking in the direction of the arrow X Fig. 1 with the rear axle and crown gear housing removed.

Fig. 3 is a view looking in the direction of the arrow Y, Fig. 1, with the tractor casing removed at the joint Z.

Fig. 4 is a sectional view of the hydraulic control valve and showing its relation to the pump.

Fig. 5 is a front elevation of the hydraulic pump and shows the control valve and connections thereto.

Fig. 5a is a side elevation of a portion of the lever shown in Fig. 5.

Fig. 6 is a sectional view on the line VI—VI, Fig. 4.

Fig. 7 is a sectional view on the line VII—VII, Fig. 4.

Fig. 8 is a part sectional plan view of the ram cylinder showing the arrangement of the safety valve and its operating mechanism.

Referring to the drawings:—

In the example shown in the drawings, 1 denotes the rear portion of the tractor casing, 2 the rear wheels of the tractor, 3 the rear axle of the tractor, 4 denotes the implement and 5 and 6 respectively denote the upper and lower link connections between the tractor and the implement which, in this particular example, is a cultivator. Obviously this may be replaced by any other implement as the occasion demands.

On the tractor and located in front of the rear axle, as shown in Fig. 1, 3 is an hydraulic ram 7, which includes the cylinders 7c and the piston of which is pivotally connected to the connecting rod 7a which, in turn, is pivotally connected at 7b to the arm 8a on the ram shaft 8. Connected to the shaft 8 are two lift arms 9 which, in turn, are connected by two lift rods 10 to the two lower links 6 connecting the frame 4a of the implement 4 with the tractor, the implement 4 being shown in the raised position. Oil is drawn from a tank or sump 11 by a pump 12 which, together with the ram connected to it by the pipe 22, constitutes a power-operated control unit or assembly referred to as a "unit" in the claims for convenience, the pump being continuously driven by the tractor engine while the engine is running. The pump is shown at Figs. 4 and 5 and it is described more specifically in my co-pending application Number 122,609 filed on the 27th of January 1937. In operation the pump delivers oil to the underside of the ball valve 34, shown below the delivery outlet in Fig. 4, to which outlet the pipe 22 is connected. When the pump is in operation, the ball valve is lifted, and the oil has two possible paths, one being through the delivery outlet 46 to the pipe 22 and the ram cylinder 7c, and the other through the by-pass passage 35 to a circular space 36 embracing the sleeve of the piston control valve 14. This sleeve is drilled as at 23 to give a restricted release port opening into the sleeve centre space, the restriction limiting the speed of lowering the implement as later described. The piston valve 14 is provided in the passage 13 which leads to the suction side of the pump. This valve 14 is for controlling the admission of oil, its movements being controlled by a hand lever 15, convenient to the operator, on the tractor. The hand lever 15 is connected with the piston valve 14 as follows:—

Its lower end is mounted on a shaft 15a carrying a crank 16, to the other end of which is pivoted the top end of a lever 17. The lower end 17a of the lever 17 is connected with a rod or wire 18 which, in turn, is connected at its opposite end to a spring loaded lever 19, pivoted at 19a, and forked at its end 19b to engage the head of the valve 14. Movement of the hand lever 15 in the direction of the arrow shown in Fig. 1 will move the end 17a of the lever 17 around a fulcrum 20, the lever being kept in contact with the fulcrum 20 by the spring 14a (Fig. 4) which is provided on one end of the valve 14, such movement of the hand lever causing the valve to move in the direction of the arrow in Fig. 4. The spring 14a also serves to keep looseness out of the mechanism and serves to take up any wear that may arise. Movement of the hand lever 15 in the opposite direction will reverse the movement of the valve.

The implement 4, as previously stated, is pivotally connected to the upper and lower links 5 and 6 by means of its frame 4a. The upper link 5 is connected at its end 5a with a rocker 24 pivoted at 24a to the back of the tractor. The rocker 24 is pivotally connected to a rod 25 on which is mounted a heavy compression spring 29. The rod 25 is pivotally connected at its opposite end to a lever 26 which is pivoted at its upper end 26a to the tractor casing and at its lower end to a rod 27 on which is fastened the fulcrum 20, previously referred to. Beyond the fulcrum 20 the front end of the said rod is slidably supported in a bearing 28. The rod 27 passes through a slot in the lever 17.

As regards the manual control of the implement the arrangement is as follows:—

When the hand lever 15 is moved from the vertical position in the direction of the arrow in Fig. 1, the lever 17 is moved anti-clockwise about the fulcrum 20, moving the rod or wire 18 to the right, which in turn operates the articulated lever 19 thereby moving the valve 14 to the left (Fig. 4) and uncovering the release ports 23 and allowing the oil to escape from the ram cylinder 7c at a slow rate. The piston thus moves slowly into the cylinder 7c under the influence of the weight of the implement which drops gently to the ground, and as a result of the draft which is then imposed on the implement it tends to turn in an anti-clockwise direction about the pivotal connection of the frame 4a. This tendency is resisted by the spring 29 which is compressed by the rod 25 moving to the left, swinging the lever 26 and causing the rod 27 with the fulcrum 20 thereon to swing to the left about its connection to the link 16. This return movement of the lever 17 allows the valve 14 to move to the right and to cover the release ports 23 without moving the hand lever 15 from the position to which it was moved by hand. When the implement reaches the desired depth the valve 14 covers the ports 21 and 23, and it will be seen that the depth is regulated by the position of the lever 15.

Adjustment of the hand lever 15 from the position shown in Fig. 1 (the raised position) moves the top of lever 17 to the left and the implement is lowered as above described. The lowering movement continues until the fulcrum 20 has been moved sufficiently far to the left to allow the valve 14 to close the ports 23 and arrest the lowering movement of the implement. Thus the further the lever 17 is moved to the left by the hand lever 15 the further will the implement be lowered before there has been sufficient movement of the fulcrum to arrest the lowering movement.

To raise the implement, the hand lever 15 is moved back to the vertical position, the bottom end of the lever 17 being moved to the left, thereby moving the rod or wire 18 and lever 19 so that the valve 14 is moved to the right and uncovers the ports 21 which are the inlet ports to the pump, allowing oil to flow to the pump which, operating through the ram and linkage 8a, 8, 9, 10 and 6, raises the implement. As the implement rises, the member 25 (due to the removal of the draft on the implement) is moved by the spring 29 to the right, thereby swinging the lower end of the lever 26 to the right which in turn moves the rod 27 and fulcrum 20 thereon, to the right, bringing the lever 17 to the right therewith, which, operating through the rod or wire 18 and lever 19 moves the valve to the left, so that, when the implement is fully raised, the valve 14 covers the ports 21 and 23, cutting off the supply of oil to the pump and cutting off the escape of oil from the pump, and keeping the implement in the raised position.

I will now describe the action of the automatic control:—Firstly, the control lever 15 is set to give the desired predetermined depth of cut in the ground. As long as the implement is working, and the draft on the implement remains the same, the compression load on the spring 29 will be constant, it being understood that, in operation, the links 5 and 6 are respectively in compression and tension. Under these conditions the valve 14 will remain on the "dead point" or mid-position, that is, with the ports 21 and 23 closed. This position of the valve 14 is shown at Fig. 4, no movement of the oil taking place in either direction and consequently no movement of the ram taking place in either direction.

If, however, the implement 4 is subjected to an increase in draft due, for example, to the front wheels of the tractor rising on a height and pitching the implement more deeply into the ground, such increase will instantaneously be transmitted to the rod 25, causing an increase in the pressure thereon, which, in turn, will cause the rod to compress the spring 29 further. At the same time the lever 26 will be moved about its pivot 26a with a resultant movement of the rod 27 and the fulcrum 20 thereby permitting the lever 17 to move to the left in Fig. 1, that is, forwardly under the action of the spring 14a on the valve 14. This forward movement of the lever 17 through the rod 18 will cause a corresponding movement of the spring loaded lever 19 which will allow the spring 14a to move the valve 14 rearwardly thus uncovering the suction ports 21 so that oil will be admitted to the pump 12, which then will pump the oil to the ram cylinder 7c and the ram piston will be moved outwardly and will raise the implement in the manner already described. When the implement has been raised to a point where the draft thereon again reaches the predetermined amount, to give the necessary depth of cut, the spring 29 reacts and brings the valve 14 back again to the "dead point" with both ports 21 and 23 closed.

If the implement be subjected to a reduction in draft, due, for example, to the front wheels of the tractor dropping into a hollow and so raising the implement relatively to the ground and thus making it cut too shallow, the action upon the spring 29 will be reversed and the valve 14 will be moved in a forward direction. This will open the restricted release ports 23, allow oil to flow back from the ram cylinder and allow the implement to fall back to the predetermined depth of cut. When the predetermined depth has been reached the control valve 14 will come back again to the "dead point" under the action of the increased draft as previously described.

When the ground engaging part 4b of the implement strikes an obstruction such as a root or a rock, the increased draft on the implement will, as previously described, put the hydraulic pump 12 into operation, tending to raise the implement out of the ground. The tendency then is for the implement 4 to be raised out of the ground altogether but it may be so caught underneath a ledge of rock or under a root that it cannot rise. Great pressure will therefore be put upon the rear wheels 2 of the tractor tending to give them increased traction and lift the front wheels of the tractor off the ground with the disadvantages hereinbefore referred to.

These difficulties are overcome when the implement is subjected to an excess of draft, due to such an obstruction, by providing that an excess of movement caused by excessive draft and transmitted from the implement 4 through the link 5 to the rod 25 against the action of the spring 29 will cause corresponding excess of movement of the lever 26, which excess of movement will be communicated to the rod 27 and so to the valve 14 as previously described.

The excess of movement of the valve 14 in a direction opposite to the arrow shown in Fig. 4 will carry the said valve right back until it uncovers the release ports 23, allowing the oil to escape from the ram cylinder thus automatically putting the power device out of effective operation. When the oil pressure has been thus released the weight of the implement is no longer carried on the tractor since it will no longer have the support thereof. This reduction in weight on the tractor wheels reduces the traction on the wheels 2 to the slipping point and the wheels will spin harmlessly.

An alternative or additional means for producing the desired result is shown in Figs. 1 and 8. As before, the excess of draft produces an excess of movement on the lever 26 and a corresponding excess of movement of the rod 27, the end 27a of this rod then comes into contact with the end 32a of the safety valve 32 provided on the ram cylinder 7c. The safety valve is then opened and the oil from the ram cylinder 7c is free to escape into the surrounding casing thus relieving the tractor of the weight of the implement with the results previously described.

Referring again to the example shown in the drawings it may be stated that the safety valve 32 serves a two-fold purpose. It acts, as described to automatically put the power device out of effective operation when the implement encounters an obstruction and it also serves as a safety valve in the ordinary way to prevent excess of pressure in the system.

A damping action on the control valve 14 is effected by a dash pot 30 having a small aperture 30a and which is adapted to receive the piston 14b formed on the valve 14.

To prevent damage to the mechanism for operating the control valve I may make the lever 19 in two sections 19c and 19d hinged together as shown in detail in Figures 5 and 5a. This lever is of course situated between the valve 14 and the control rod 17, a spring 31 serving normally to hold together the two portions of the lever 19 as shown in Fig. 5a. The arrangement is such that if the operator unduly forces the control, the jointed lever 19, which can only transmit a certain load (depending upon the strength of the spring 31) will, when the load is excessive permit of the control lever 15 being moved to the full extent of its travel without damaging the control valve or its mechanism, the excess movement or force applied simply causing the portion 19a to pivot and stretch the spring 31.

An implement such as hereinbefore described is usually transported on a tractor by raising it to a predetermined height above the ground; I provide automatic means connected with the mechanism hereinbefore described for cutting off the supply of fluid to the pump 12 so that when the implement has been raised to a predetermined height it will automatically stop ascending. In the example shown this is accomplished in the following manner:—

When the implement 4 is raised by the mechanism hereinbefore described and shown in the drawings, the ram piston in moving rearwardly, that is outwardly, contacts with a projection 17b on the lever 17 (Fig. 2) and in continuing its movement it moves the lever 17 rearwardly, giving a corresponding movement to the valve control rod 18 and lever 19 and so moving the valve 14 to cause it to come to the "dead point" and close off the supply of oil to the pump. Thus, when the implement is being transported no fluid is being pumped.

I claim:—

1. In a tractor having means for the attachment of an agricultural implement and a power-operated control unit for moving said implement up and down with reference to the tractor; means for manually controlling said unit, and means automatically rendered operable by the implement for putting said unit out of effective operation when there is an excess of draft on the implement.

2. A tractor comprising means for the attachment of an agricultural implement, a unit embodying power means for moving said implement up and down with reference to the tractor and means operable by the implement for putting said power means out of effective relationship with the implement when there is an excess of draft on the latter.

3. For a tractor having means for the attachment of an agricultural implement and power means for moving said implement into and out of active position with relation to the tractor, mechanism for controlling said power means, and a plurality of means for controlling the said mechanism, one of the last said means being itself controlled by the implement when there is an excess of draft on the latter, to render the said power means ineffective with relation to the implement.

4. In a tractor having means for the attachment of an agricultural implement and a power-operated control unit comprising a pump and a device operable by pressure fluid from the pump for moving the implement up and down with reference to the tractor; valve means operable by the implement for relieving the fluid pressure on said device when there is an excess of draft on the implement.

5. In a tractor having means for the attachment of an agricultural implement and a power-operated control unit comprising a pump and a device operable by pressure fluid from the pump for moving the implement up and down with reference to the tractor; valve means on the delivery side of the pump and operable by the implement for relieving the fluid pressure on said device when there is an excess of draft on the implement.

6. In a tractor having means for the attachment of an agricultural implement and a power-operated control unit comprising a pump and a device operable by pressure fluid from the pump for moving the implement up and down with reference to the tractor; a piston valve, admission and outlet ports for the pump so spaced that the piston valve covers said ports when in its mid-position and means operatively connecting the piston valve and the implement so that when the implement is subjected to an excess of draft the piston valve is moved until the end thereof remote from the outlet port has uncovered same.

7. For a tractor for drawing an agricultural implement, a power-operated control unit having means for operating same in accordance with the draft on the implement to maintain the latter at a predetermined depth of cut, said means being adapted to render said unit inoperative when the implement is subjected to an excessive draft.

8. In a tractor having means for the attachment of an agricultural implement and a power-operated control unit comprising a pump and a device operable by pressure fluid from the pump for moving the implement up and down with reference to the tractor; valve means operable by the implement in accordance with the draft thereon for relieving the fluid pressure on said device when the implement is subjected to an excessive draft and a pressure-operable safety valve in the control unit to protect same from excessive pressure.

9. In a tractor having means for the attachment of an agricultural implement and a power-operated control unit comprising a pump and a device operable by pressure fluid from the pump for moving the implement up and down with reference to the tractor; a piston valve, admission and outlet ports for the pump so spaced that the piston valve covers said ports when in its mid-position and means operatively connecting the piston valve and the implement so that when the implement is subjected to an excess of draft the piston valve is moved until the end thereof remote from the outlet port has uncovered same, a pressure-operable safety valve in the control unit to protect same from excessive pressure and means movable by the implement for opening said safety valve when the implement is subjected to an excessive draft.

10. A tractor and an agricultural implement attached thereto, said tractor comprising a member movable against the action of resistant means in accordance with the draft on the implement, a power unit for raising and lowering the implement on the tractor and means for rendering said unit inoperative, said means being controlled by said member so that, when said member is moved excessively due to an excess of draft on the implement, the power unit is rendered inoperative.

11. A tractor and an agricultural implement attached thereto, said tractor comprising a member movable against the action of spring means in accordance with the draft on the implement, a pressure-fluid power unit for raising and lowering the implement on the tractor, and including a pump driven by the tractor-propelling means, a piston valve, admission and outlet valves for the pump so spaced that the piston valve covers said ports when in its mid-position, and operating means for said valve, said means being controlled by said member so that, when said member is excessively moved due to an excess of draft on the implement, the valve is moved until the end remote from the release port uncovers same.

12. A tractor and an agricultural implement attached thereto, said tractor comprising a member movable against the action of spring means by the implement in accordance with the draft thereon, a pressure-fluid power unit for raising and lowering the implement on the tractor including a pump driven by the tractor-propelling means, a piston valve, admission and outlet valves for the pump so spaced that the piston valve covers said ports when in its mid-position, and operating means for said valve, said means being controlled by said member so that, when said member is excessively moved due to an excess of draft on the implement, the valve is moved until the end remote from the release port uncovers same, and comprising a pressure-operable valve on the delivery side of said pump adapted also to be opened by said member when there is an increase of draft on the implement.

13. A tractor and an agricultural implement attached thereto by links, said tractor comprising a rod with a fulcrum thereon movable against the action of spring means by the implement in accordance with the draft thereon, a power unit for raising and lowering the implement on the tractor automatically in accordance with the draft on the implement and including an oil pump and a piston and cylinder device hydraulically connected to the pump and mechanically connected to at least one of said links, a piston valve, admission and release ports for the pump so spaced that the piston valve covers said ports when in its mid-position, operating means for the valve including spring means urging the valve towards the release port and a "floated lever" connected at one end to the valve and at its other to a manual control and a pressure-operable valve on the cylinder, said floating lever being allowed to move by said fulcrum, when same is excessively moved due to an excessive draft on the implement, so that said spring moves the piston valve until the end remote from the release port uncovers same, said rod also opening the pressure-operable valve when there is said excessive draft on the implement.

HENRY GEORGE FERGUSON.